United States Patent
Ku et al.

(10) Patent No.: US 12,263,880 B2
(45) Date of Patent: Apr. 1, 2025

(54) STEERING DEVICE OF VEHICLE

(71) Applicant: HL Mando Corporation, Pyeongtaek-si (KR)

(72) Inventors: Sangchul Ku, Seoul (KR); Sunghun Park, Anyang-si (KR); Jeongrae Kim, Seoul (KR); Sungjune Moon, Seoul (KR); Taeho Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/385,663

(22) Filed: Oct. 31, 2023

(65) Prior Publication Data

US 2024/0326894 A1 Oct. 3, 2024

(30) Foreign Application Priority Data

Mar. 31, 2023 (KR) .......................... 10-2023-0043055

(51) Int. Cl.
| | |
|---|---|
| *B62D 1/181* | (2006.01) |
| *B62D 1/183* | (2006.01) |
| *B62D 1/185* | (2006.01) |
| *B62D 1/187* | (2006.01) |

(52) U.S. Cl.
CPC ............ *B62D 1/181* (2013.01); *B62D 1/183* (2013.01); *B62D 1/185* (2013.01); *B62D 1/187* (2013.01); *B60Y 2400/83* (2013.01)

(58) Field of Classification Search
CPC ........ B62D 1/181; B62D 1/183; B62D 1/185; B62D 1/187; B60Y 2400/83
See application file for complete search history.

(56) References Cited

U.S. PATENT DOCUMENTS

| | | | | |
|---|---|---|---|---|
| 4,691,587 A | * | 9/1987 | Farrand ................. | B62D 1/181 280/775 |
| 5,035,446 A | * | 7/1991 | Arvidsson ............. | B62D 1/181 280/775 |
| 5,131,287 A | * | 7/1992 | Stromberg ............ | B62D 1/184 280/775 |
| RE34,359 E | * | 8/1993 | Matsumoto ........... | B62D 1/181 74/495 |

(Continued)

OTHER PUBLICATIONS

Office Action dated Sep. 16, 2024 for corresponding German Patent Application No. 10 2023 133 214.7, along with an English machine translation (13 pages).

*Primary Examiner* — Timothy Wilhelm

(74) *Attorney, Agent, or Firm* — Hauptman Ham, LLP

(57) ABSTRACT

A steering device of a vehicle includes an upper tube receiving a steering shaft, a lower tube receiving the upper tube, a movable bracket to which one end of the lower tube is hinged, a fixed bracket to which the movable bracket being slidably coupled in an axial direction, a first driver for sliding the upper tube with respect to the lower tube, a second driver axially fixed to the fixed bracket to tilt the lower tube with respect to the movable bracket, and a third driver for sliding the movable bracket with respect to the fixed bracket. The steering device makes it possible to quickly and stably perform an operation of storing and withdrawing the steering wheel for securing a space in a driver's seat, and enhance operation stability by minimizing interference with peripheral components during the operation of storing and withdrawing the steering wheel.

17 Claims, 12 Drawing Sheets

(56) References Cited

U.S. PATENT DOCUMENTS

| | | | | |
|---|---|---|---|---|
| 5,477,744 A * | 12/1995 | Hoblingre | ............... | B62D 1/192 74/89.17 |
| 6,079,743 A * | 6/2000 | Grams | ................... | B62D 1/181 280/775 |
| 6,474,189 B1 * | 11/2002 | Koellisch | ................ | G05G 1/30 280/775 |
| 6,711,965 B2 * | 3/2004 | Tomaru | ................... | B62D 1/181 318/470 |
| 7,159,904 B2 * | 1/2007 | Schafer | .................. | B62D 1/187 280/775 |
| 7,617,866 B2 * | 11/2009 | Pietras | ................... | E21B 19/16 166/77.51 |
| 7,631,898 B2 * | 12/2009 | Bechtel | ................. | B62D 1/184 280/775 |
| 8,151,668 B2 * | 4/2012 | Oshita | .................... | B62D 1/192 280/774 |
| 8,161,839 B2 * | 4/2012 | Warashina | ............. | B62D 1/181 74/493 |
| 8,650,983 B2 * | 2/2014 | Mizuno | ................. | B62D 1/181 74/496 |
| 8,904,902 B2 * | 12/2014 | Lee | ........................ | B62D 1/181 280/775 |
| 8,910,976 B2 * | 12/2014 | Toyoda | .................. | B62D 1/181 280/775 |
| 8,991,861 B1 * | 3/2015 | Iwakawa | ................ | B62D 1/181 74/495 |
| 9,038,495 B2 * | 5/2015 | Morinaga | ............. | B62D 1/181 74/493 |
| 9,260,130 B2 * | 2/2016 | Mizuno | ................. | B62D 1/187 |
| 9,487,228 B2 * | 11/2016 | Fevre | ..................... | B62D 1/181 |
| 9,616,914 B2 * | 4/2017 | Stinebring | ............ | B62D 1/181 |
| 9,663,136 B2 * | 5/2017 | Stinebring | ............ | B62D 1/195 |
| 9,669,863 B2 * | 6/2017 | Ku | ........................ | B62D 1/195 |
| 9,849,904 B2 * | 12/2017 | Rouleau | ................ | B62D 1/183 |
| 10,189,496 B2 * | 1/2019 | King | ....................... | B62D 1/184 |
| 10,421,476 B2 * | 9/2019 | Rouleau | ................ | B62D 1/184 |
| 10,464,592 B2 * | 11/2019 | Messing | ................ | F16H 25/20 |
| 10,479,394 B2 * | 11/2019 | Kato | .................... | B62D 5/0409 |
| 10,577,010 B2 * | 3/2020 | Derocher | .............. | B62D 1/183 |
| 10,604,172 B2 * | 3/2020 | Yoon | .................... | B62D 1/187 |
| 10,633,013 B2 * | 4/2020 | Kreutz | .................. | B62D 5/001 |
| 10,640,139 B2 * | 5/2020 | Derocher | .............. | B62D 1/183 |
| 10,882,548 B2 * | 1/2021 | Freudenstein | ......... | B62D 1/181 |
| 10,906,576 B2 * | 2/2021 | Sherwood | .............. | B62D 1/189 |
| 10,933,902 B2 * | 3/2021 | Specht | .................. | B62D 1/181 |
| 10,960,917 B2 * | 3/2021 | Schnitzer | ............... | B62D 1/195 |
| 10,967,898 B2 * | 4/2021 | Schmidt | ................ | F16C 29/123 |
| 10,974,757 B2 * | 4/2021 | Raich | ..................... | B62D 1/181 |
| 11,001,292 B2 * | 5/2021 | Derocher | .............. | B62D 1/195 |
| 11,345,387 B2 * | 5/2022 | Kurokawa | ............. | B62D 1/181 |
| 11,383,756 B2 * | 7/2022 | Ryne | ..................... | B62D 1/185 |
| 11,511,789 B2 * | 11/2022 | Geiselberger | .......... | B62D 1/181 |
| 11,623,677 B2 * | 4/2023 | Kurokawa | ............. | B62D 1/181 74/493 |
| 11,697,449 B2 * | 7/2023 | Ryne | ..................... | B62D 1/187 74/484 R |
| 11,745,787 B2 * | 9/2023 | Ryne | ..................... | F16H 53/06 74/493 |
| 11,753,063 B2 * | 9/2023 | Ku | ......................... | B62D 1/187 74/493 |
| 11,866,087 B2 * | 1/2024 | Ponikiewski | .......... | B62D 1/181 |
| 11,904,933 B2 * | 2/2024 | Ku | ......................... | B62D 1/192 |
| 11,919,564 B2 * | 3/2024 | Fevre | ..................... | B62D 1/181 |
| 11,919,565 B2 * | 3/2024 | Park | ...................... | B62D 1/185 |
| 11,931,891 B2 * | 3/2024 | Hayashi | ................ | A63H 11/00 |
| 2004/0023746 A1 * | 2/2004 | Arihara | ................. | B62D 1/181 475/281 |
| 2006/0191368 A1 * | 8/2006 | Sawada | ................. | B62D 1/181 74/495 |
| 2006/0266151 A1 * | 11/2006 | Avers | ..................... | B62D 1/181 74/492 |
| 2007/0029771 A1 * | 2/2007 | Haglund | ................ | B62D 1/181 280/775 |
| 2007/0151392 A1 * | 7/2007 | Oshita | ................... | B62D 1/192 74/493 |
| 2009/0064814 A1 * | 3/2009 | Tanaka | .................. | B62D 1/181 74/493 |
| 2011/0215560 A1 * | 9/2011 | Born | ...................... | B62D 1/181 280/775 |
| 2012/0043746 A1 * | 2/2012 | Welker | ................... | F41H 7/046 280/779 |
| 2015/0375768 A1 * | 12/2015 | Fevre | ..................... | B62D 1/181 74/493 |
| 2016/0375929 A1 * | 12/2016 | Rouleau | ................ | B62D 1/181 74/493 |
| 2017/0029009 A1 * | 2/2017 | Rouleau | ................ | B62D 1/181 |
| 2018/0050720 A1 * | 2/2018 | King | ....................... | B62D 1/184 |
| 2018/0079445 A1 * | 3/2018 | Kato | .................... | B62D 5/0409 |
| 2019/0111960 A1 * | 4/2019 | Freudenstein | ......... | B62D 1/185 |
| 2019/0126968 A1 * | 5/2019 | Messing | ................ | B62D 1/181 |
| 2019/0210632 A1 * | 7/2019 | Derocher | .............. | B62D 1/181 |
| 2019/0300042 A1 * | 10/2019 | Derocher | .............. | B62D 1/185 |
| 2021/0129894 A1 * | 5/2021 | Ryne | ..................... | B60K 35/10 |
| 2021/0129896 A1 * | 5/2021 | Ryne | ..................... | B62D 1/187 |
| 2021/0229733 A1 * | 7/2021 | Kurokawa | ............. | B62D 1/184 |
| 2022/0402540 A1 * | 12/2022 | Fevre | ..................... | B62D 1/184 |

* cited by examiner

STEERING DEVICE OF VEHICLE

CROSS-REFERENCE TO RELATED APPLICATION

This application claims priority from Korean Patent Application No. 10-2023-0043055, filed on Mar. 31, 2023, which is hereby incorporated by reference for all purposes as if fully set forth herein.

BACKGROUND

Field

Embodiments of the disclosure relate to a steering device of a vehicle, and more particularly, to a steering column of a vehicle capable of quickly and stably performing an operation of storing and withdrawing the steering wheel for securing a space in a driver's seat, and enhancing operation stability by minimizing interference with peripheral components during the operation of storing and withdrawing the steering wheel.

Description of Related Art

A vehicle steering device is a device for changing the traveling direction of the vehicle as intended by the driver and turns the left and right wheels of the vehicle to the left or right to allow the vehicle to travel in the direction desired by the driver.

The steering device includes a steering column for receiving the steering shaft connected with the steering wheel. Typically, the steering column has telescoping and tilting functionality for adjusting the position of the steering wheel to fit the driver's height and body shape.

Recently, autonomous vehicles are advancing rapidly. Autonomous vehicles provide various features for enabling the driver to do various activities in autonomous driving mode. Since the steering wheel takes up a lot of space in the driver's seat and interferes with the driver's movement, a steering column that may store the steering wheel in the vehicle body in autonomous driving mode and withdraw the steering wheel from the vehicle body in manual mode is being developed.

However, as the traveling distance of the steering wheel increases, the time required for storing and withdrawing the steering wheel increases and the rigidity decreases, so there is a need for a steering column that quickly and stably stores and withdraws the steering wheel.

Further, when the steering wheel is stored and withdrawn, the components of the steering column are also moved in an axial direction of the steering column, and as the moving distance of the steering wheel increases, interference between the components of the steering column and peripheral components may occur. Due to interference between the components of the steering column and the peripheral components, the operation of storing or withdrawing the steering wheel may be hindered or the peripheral components may fail, and thus there is a need for a steering column or a steering device that prevents the operation of storing or withdrawing the steering wheel from being hindered and prevents failure of the peripheral components.

SUMMARY

As devised in the foregoing background, embodiments relate to a steering column of a vehicle capable of quickly and stably performing an operation of storing and withdrawing the steering wheel for securing a space in a driver's seat, and enhancing operation stability by minimizing interference with peripheral components during the operation of storing and withdrawing the steering wheel.

According to some embodiments, a steering device of a vehicle includes an upper tube receiving a steering shaft, a lower tube receiving the upper tube, a movable bracket to which one end of the lower tube is hinged, a fixed bracket configured to fixed to a vehicle body, wherein the movable bracket is slidably coupled to the fixed bracket in an axial direction of the steering device, a first driver for sliding the upper tube with respect to the lower tube, a second driver axially fixed to the fixed bracket to tilt the lower tube with respect to the movable bracket, and a third driver for sliding the movable bracket with respect to the fixed bracket.

According to some embodiments, a steering device of a vehicle includes an upper tube receiving a steering shaft, a lower tube receiving the upper tube, a movable bracket to which one end of the lower tube is hinged, a fixed bracket configured fixed to a vehicle body, wherein the movable bracket is slidably coupled to the fixed bracket in an axial direction of the steering device, a first driver for sliding the upper tube with respect to the lower tube, a second driver for tilting the lower tube with respect to the movable bracket, a coupling bracket coupling the second driver to the fixed bracket, and a third driver for sliding the movable bracket with respect to the fixed bracket.

According to some embodiments, it is possible to quickly and stably perform an operation of storing and withdrawing the steering wheel for securing a space in a driver's seat, and enhance operation stability by minimizing interference with peripheral components during the operation of storing and withdrawing the steering wheel.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
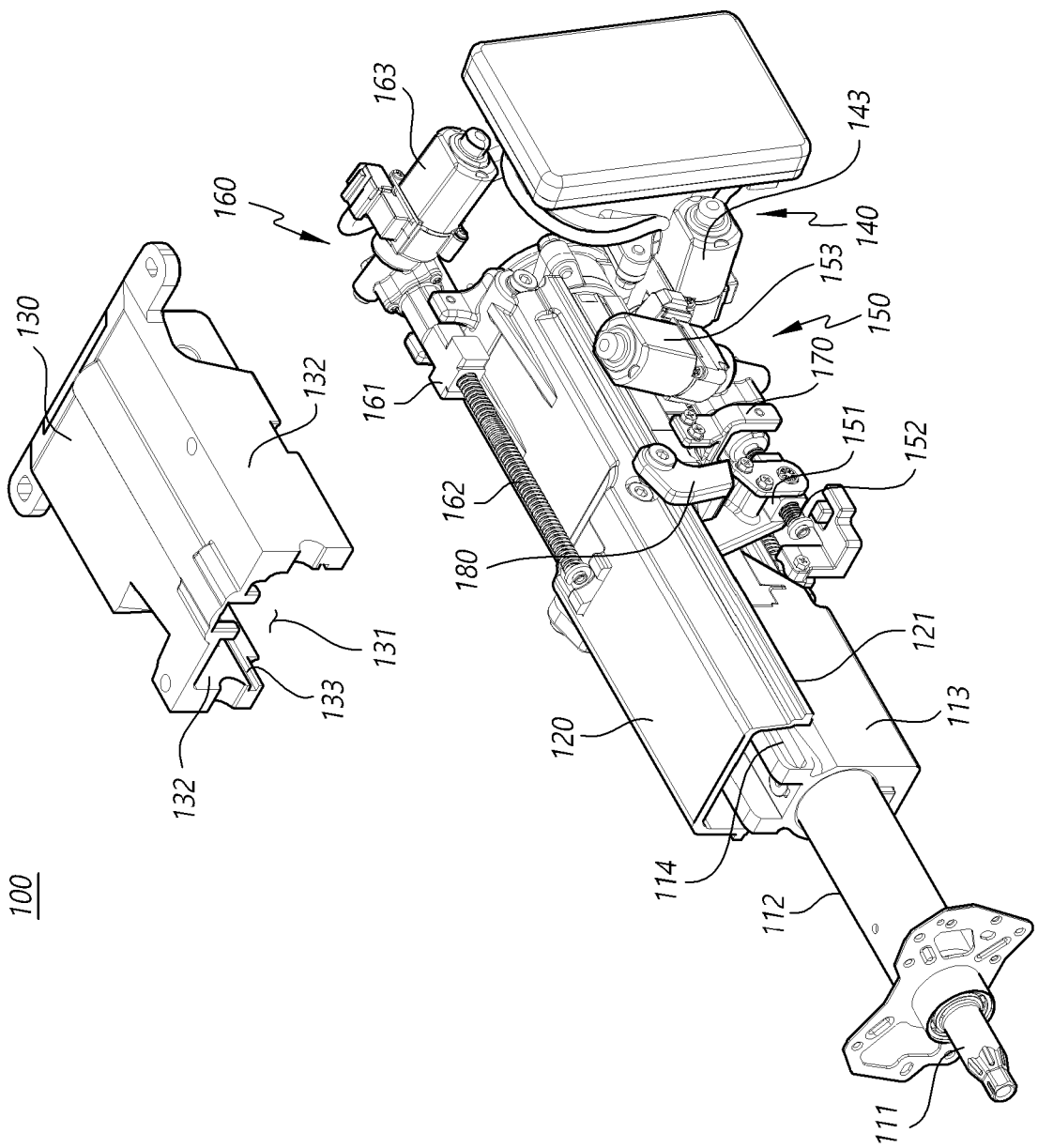
FIG. 1 is an exploded perspective view illustrating a steering device for a vehicle according to some embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
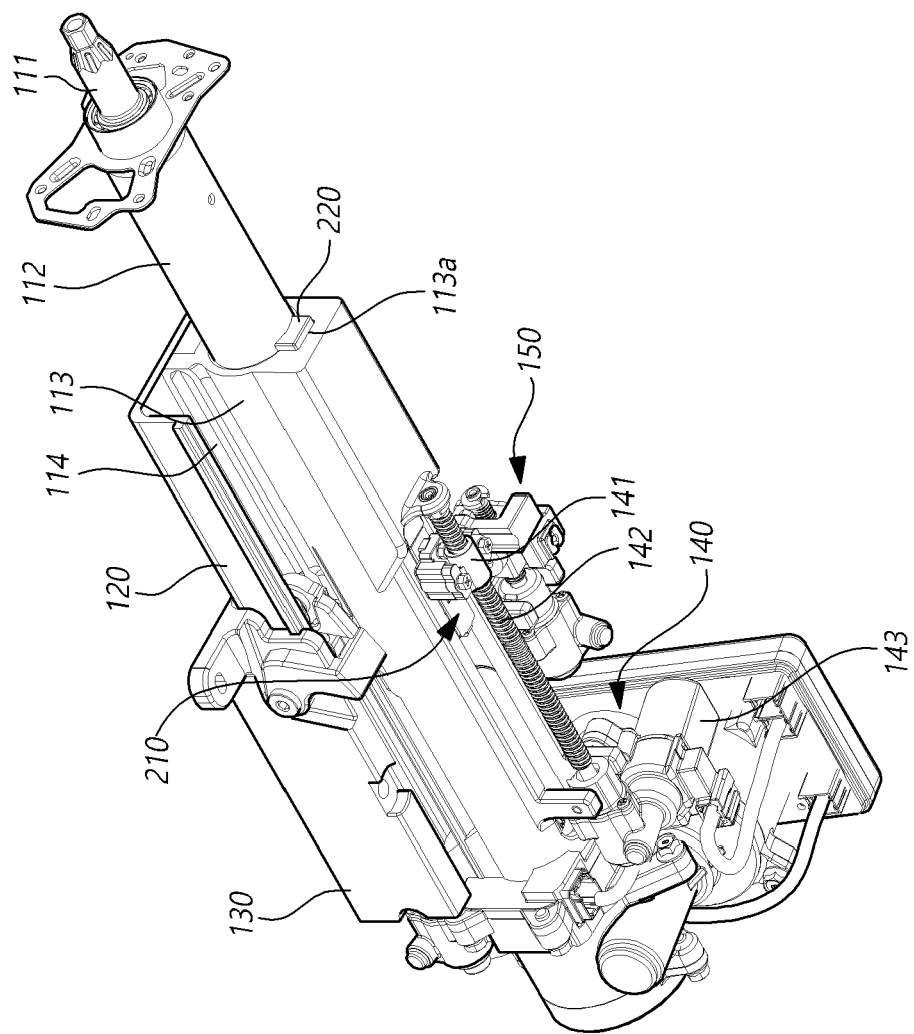
FIG. 2 is a perspective view illustrating a steering device of a vehicle according to some embodiments.
Figure 3:
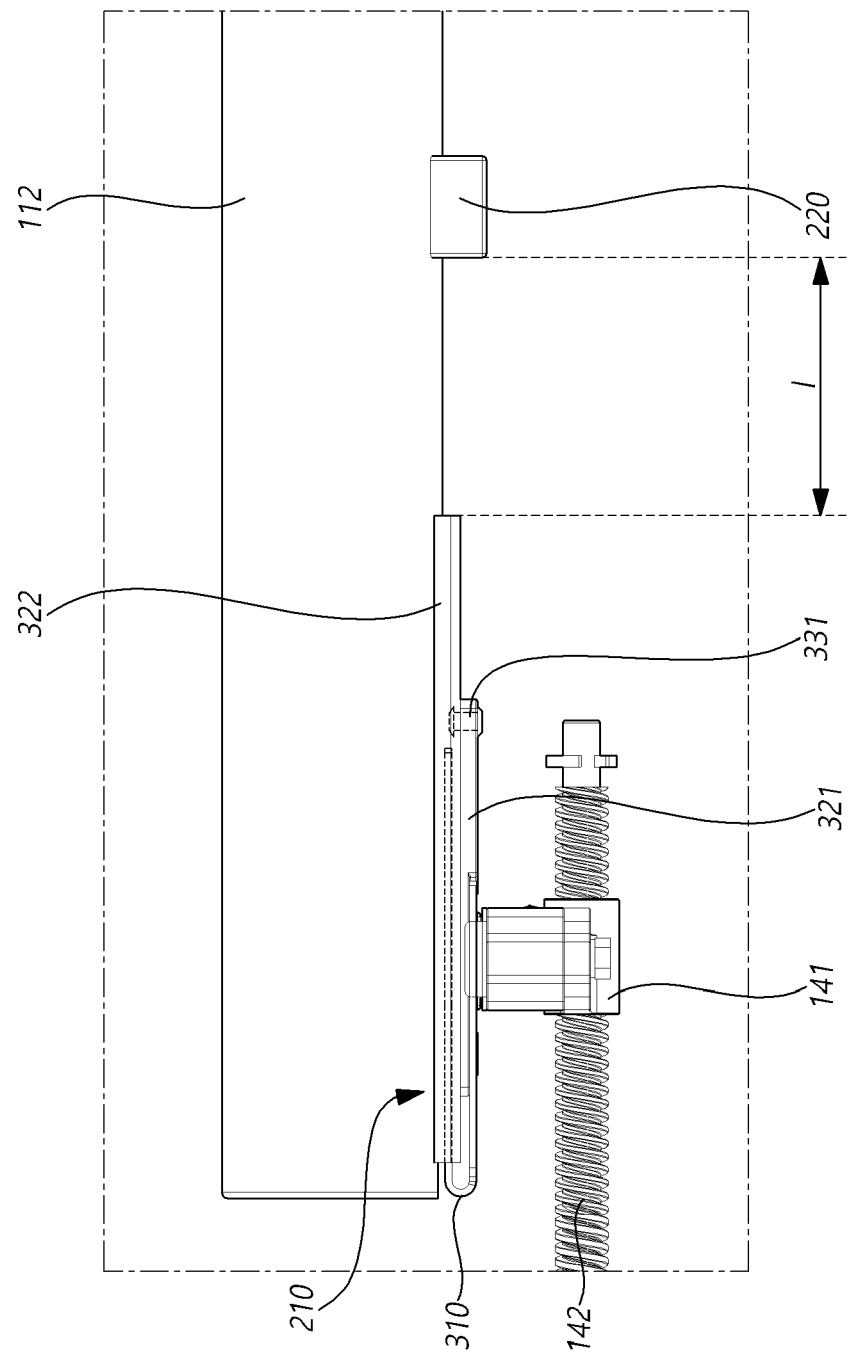
FIG. 3 is a side view illustrating a portion of a steering device of a vehicle according to some embodiments.
Figure 4:
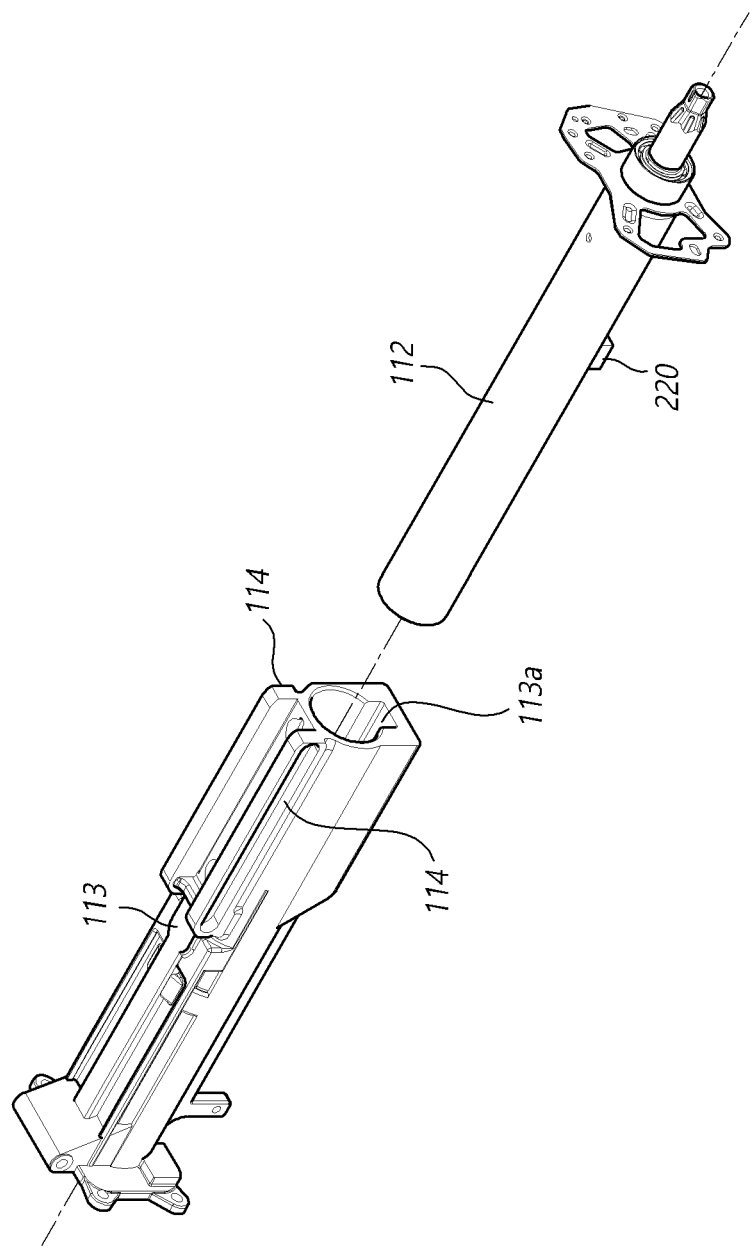
FIG. 4 is an exploded perspective view illustrating a portion of a steering device of a vehicle according to some embodiments.
Figure 5A:
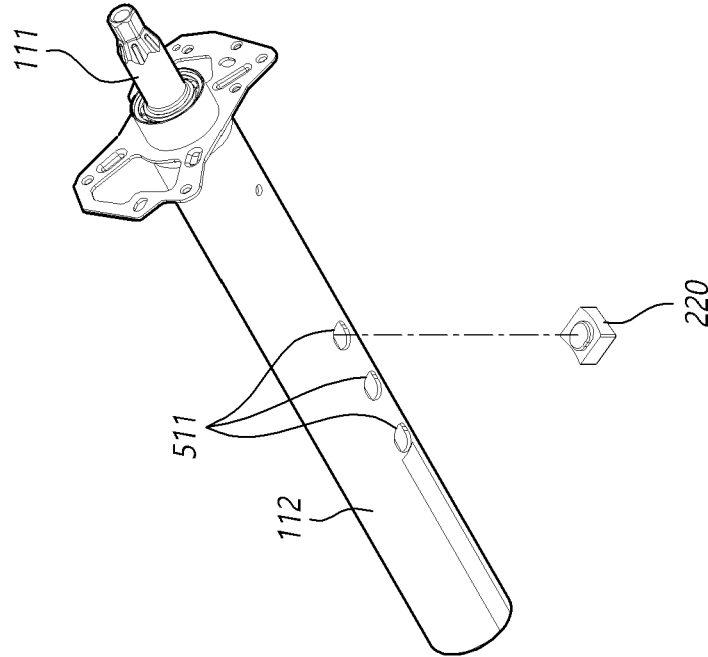
FIG. 5A is a perspective view illustrating a portion of a steering device of a vehicle according to some embodiments.
Figure 5B:
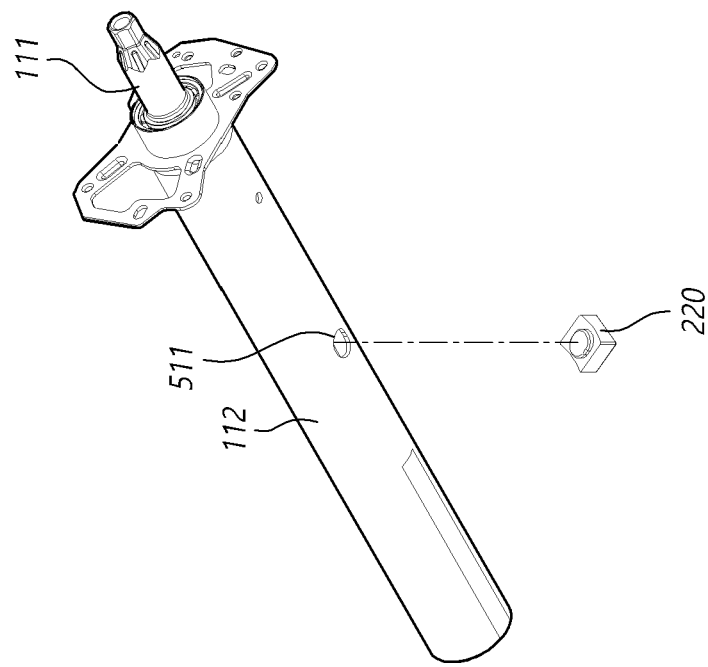
FIG. 5B is a perspective view illustrating a portion of a steering device of a vehicle according to some embodiments.
Figure 6:
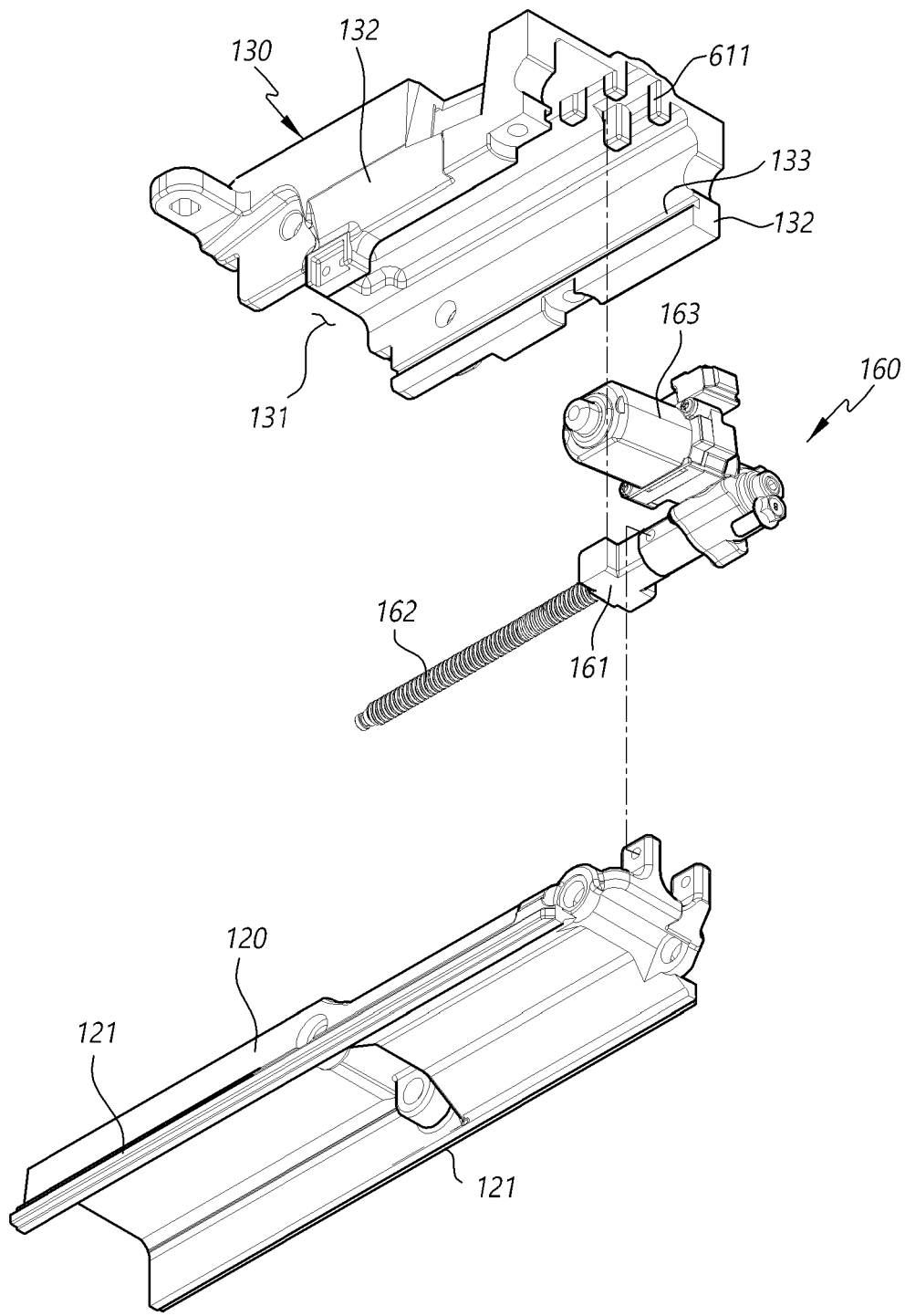
FIG. 6 is an exploded perspective view illustrating a portion of a steering device of a vehicle according to some embodiments.
Figure 7A:
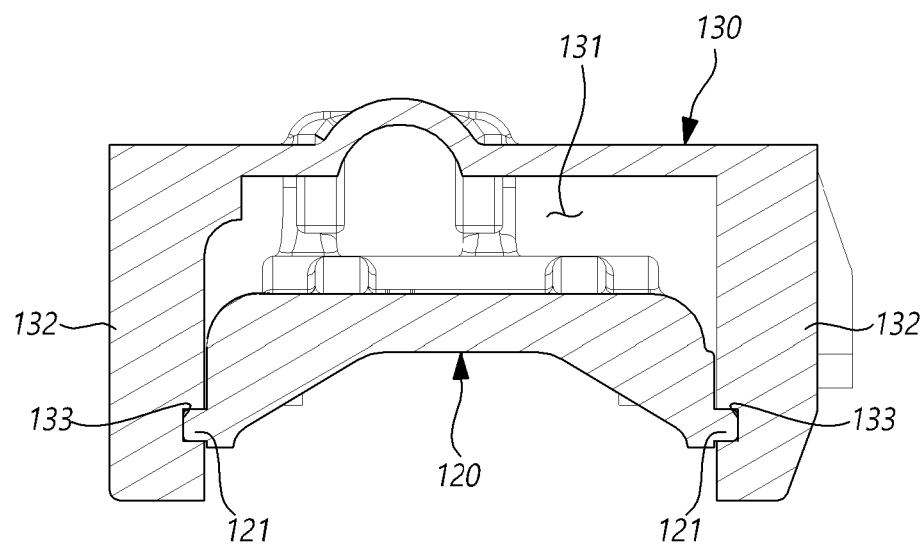
FIG. 7A is a cross-sectional view illustrating a portion of a steering device of a vehicle according to some embodiments.
Figure 7B:
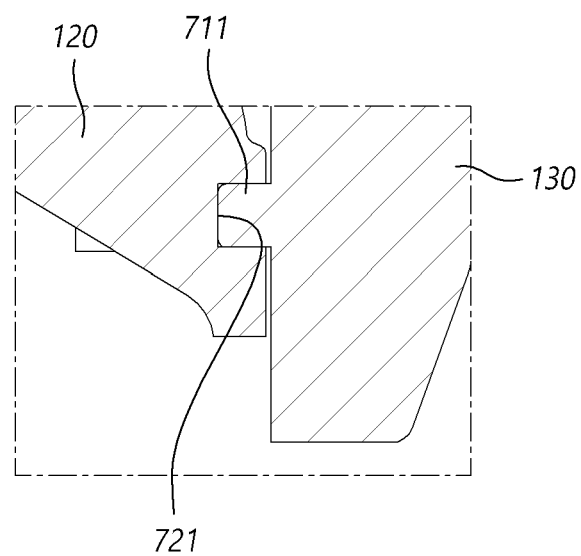
FIG. 7B is a cross-sectional view illustrating a portion of a steering device of a vehicle according to some embodiments.
Figure 8:
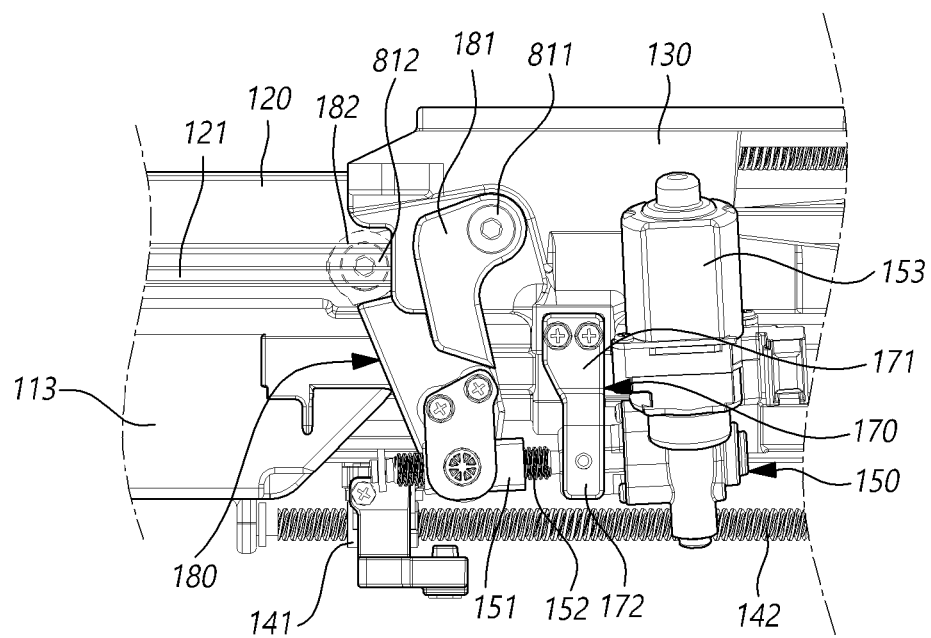
FIG. 8 is a side view illustrating a portion of a steering device of a vehicle according to some embodiments.
Figure 9:
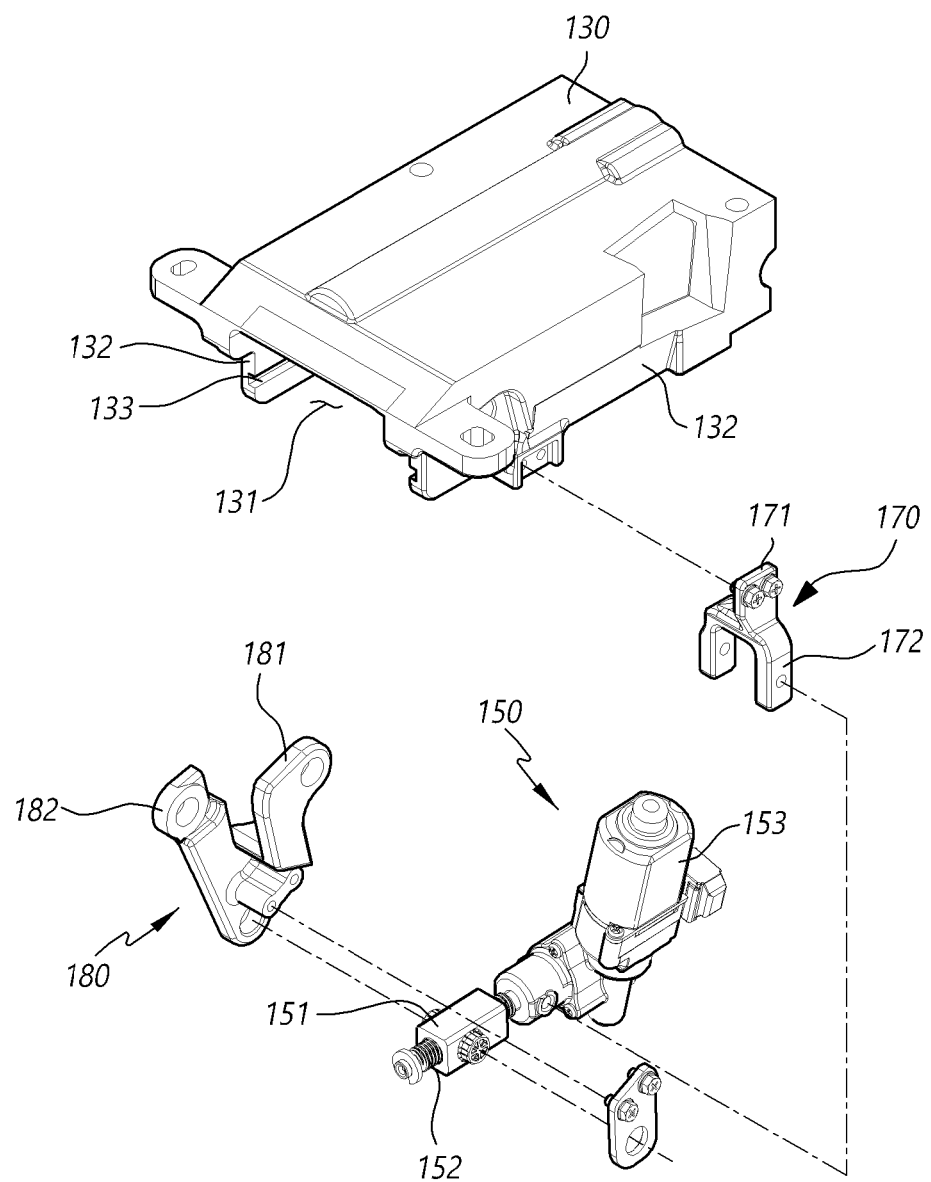
FIG. 9 is an exploded perspective view illustrating a portion of a steering device of a vehicle according to some embodiments.
Figure 10:
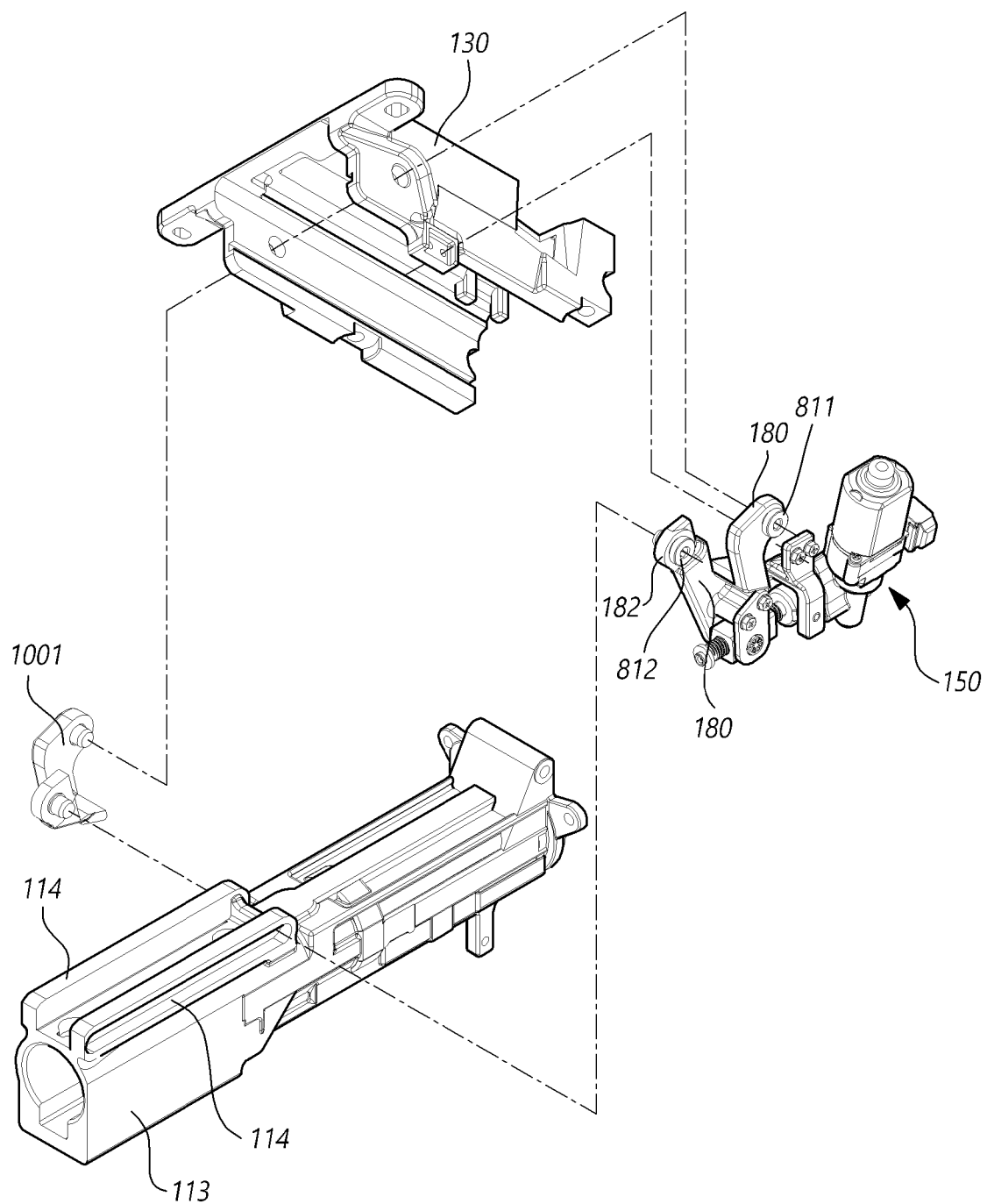
FIG. 10 is an exploded perspective view illustrating a portion of a steering device of a vehicle according to some embodiments.
Figure 11:
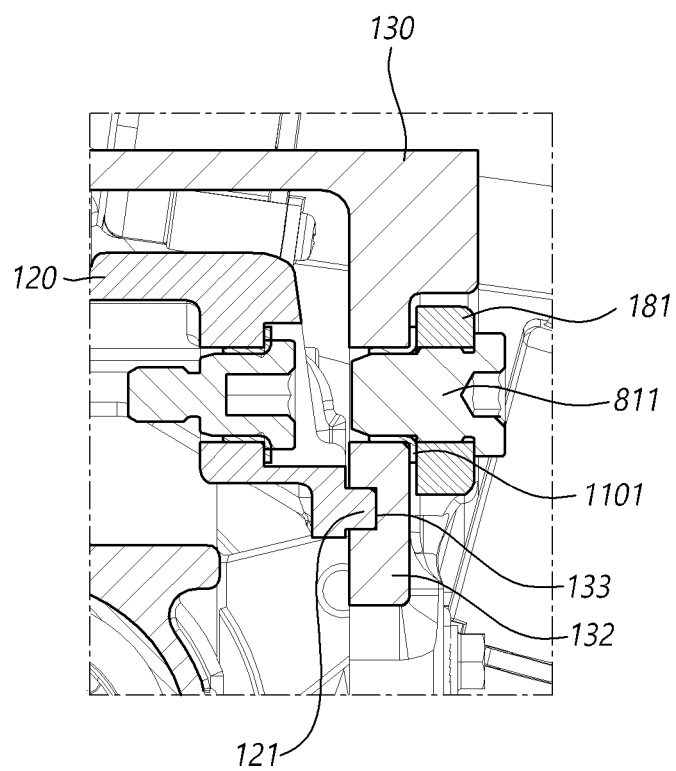
FIG. 11 is a cross-sectional view illustrating a portion of a steering device of a vehicle according to some embodiments.
Figure 12:
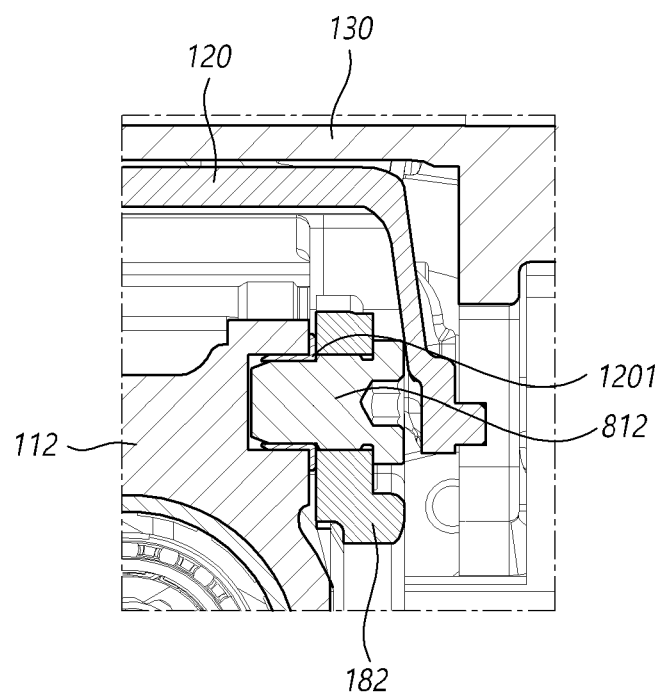
FIG. 12 is a cross-sectional view illustrating a portion of a steering device of a vehicle according to some embodiments.

FIG. 1 is an exploded perspective view illustrating a steering column or a steering device for a vehicle according to some embodiments. FIG. 2 is a perspective view illustrating a steering device of a vehicle according to some embodiments. FIG. 3 is a side view illustrating a portion of a steering device of a vehicle according to some embodiments. FIG. 4 is an exploded perspective view illustrating a portion of a steering device of a vehicle according to some embodiments. FIG. 5A is a perspective view illustrating a portion of a steering device of a vehicle according to some embodiments. FIG. 5B is a perspective view illustrating a portion of a steering device of a vehicle according to some embodiments. FIG. 6 is an exploded perspective view illustrating a portion of a steering device of a vehicle according to some embodiments. FIG. 7A is a cross-sectional view illustrating a portion of a steering device of a vehicle according to some embodiments. FIG. 7B is a cross-sectional view illustrating a portion of a steering device of a vehicle according to some embodiments. FIG. 8 is a side view illustrating a portion of a steering device of a vehicle according to some embodiments. FIG. 9 is an exploded perspective view illustrating a portion of a steering device of a vehicle according to some embodiments. FIG. 10 is an exploded perspective view illustrating a portion of a steering device of a vehicle according to some embodiments. FIG. 11 is a cross-sectional view illustrating a portion of a steering device of a vehicle according to some embodiments. FIG. 12 is a cross-sectional view illustrating a portion of a steering device of a vehicle according to some embodiments.

Referring to FIGS. 1 and 2, a steering device 100 of a vehicle according to some embodiments includes an upper tube 112, a lower tube 113, a movable bracket 120, a fixed bracket 130, a first driver 140, a second driver 150, and a third driver 160.

Specifically, a steering device 100 of a vehicle according to some embodiments includes the upper tube 112 receiving a steering shaft 111, the lower tube 113 receiving the upper tube 112, the movable bracket 120 to which one end of the lower tube 113 is hinged, the fixed bracket 130 configured to be fixed to a vehicle body, wherein the movable bracket 120 is slidably coupled to the fixed bracket 130 in an axial direction of the steering device 100, the first driver 140 for sliding the upper tube 112 with respect to the lower tube 113, the second driver 150 axially fixed to the fixed bracket 130 to tilt the lower tube 113 with respect to the movable bracket 120, and the third driver 160 for sliding the movable bracket 120 with respect to the fixed bracket 130.

The upper tube 112 receives the steering shaft 111 and is inserted into the lower tube 113 to be axially slidable with respect to the lower tube 113. The first driver 140 is coupled to the upper tube 112 and the lower tube 113. As the first driver 140 causes the upper tube 112 to slide with respect to the lower tube 113, a telescoping motion of the steering device 100 is performed.

According to some embodiments, the first driver 140 includes a nut 141 coupled to the upper tube 112, a screw 142 engaged with the nut 141, and a motor 143 coupled to the lower tube 113 to rotate the screw 142. A telescoping motion is performed by driving the first driver 140, and during the telescoping motion, the motor 143 is fixed in the axial direction with respect to the lower tube 113 and the nut 141 is fixed in the axial direction with respect to the upper tube 112. Further during the telescoping motion, the screw 142 is rotated by the motor 143, and the nut 141 is moved on the screw 142, and accordingly, the upper tube 112 is moved axially with respect to the lower tube 113.

According to some embodiments, the first driver 140 further includes a reducer connecting the screw 142 and the motor 143. In some embodiments, the motor 143 is coupled to the lower tube 113 through a housing receiving the reducer. In some embodiments, the reducer connecting the screw 142 and the motor 143 is, but not limited to, e.g., a reducer including a worm shaft-worm wheel.

Referring to FIG. 3, according to some embodiments, the nut 141 is coupled to the upper tube 112 through an impact load absorber 210 including a bending plate 310. The impact load absorber 210 fixes the nut 141 and the upper tube 112 in the axial direction in the telescoping motion. However, when an external impact, such as a vehicle collision where an external force is applied to the steering device of the vehicle, occurs, the nut 141 and the upper tube 112 are no longer fixed in the axial direction, and a collapsing motion starts. In the process of the collapsing motion, the bending plate 310 is plastically deformed, and the impact load absorber 210 absorbs the impact load to protect the driver of the vehicle.

The impact load absorber 210 further includes a first bracket 321 coupled to one end of the bending plate 310 and the nut 141, and a second bracket 322 fixed to the upper tube 112 and coupled to the first bracket 321 through a front end member 331. In the telescoping motion, the first bracket 321 and the second bracket 322 are fixed in the axial direction by the front end member 331. However, when the front end member 331 is broken by an external impact, the collapsing motion is started, and the upper tube 112 and the nut 141 are moved relative to each other. In the process of the collapsing motion, the bending plate 310 is plastically deformed, absorbing the impact load.

According to some embodiments, a stopper 220 overlapping the impact load absorber 210 in the axial direction is provided on an outer circumferential surface of the upper tube 112. The stopper 220 overlaps the impact load absorber 210 in the axial direction on the outer circumferential surface of the upper tube 112 and is spaced apart from the impact load absorber 210 by a predetermined distance. In the telescoping motion, since the impact load absorber 210 moves together with the upper tube 112, the distance between the stopper 220 and the impact load absorber 210 is maintained. However, in the collapsing motion, as the collapsing motion proceeds, the distance between the stopper 220 and the impact load absorber 210 is reduced, the stopper 220 is supported axially by the impact load absorber 210, and the collapsing stroke is limited. More specifically, the stopper 220 is supported in the axial direction on the first bracket 321, and the collapsing stroke is limited.

Since the stopper 220 is supported by the impact load absorber 210 in the axial direction and the maximum collapsing stroke (see reference numeral l in FIG. 3) is limited, it is possible to structurally prevent the stopper 220 from collapsing deeper than the plastic deformation stroke of the bending plate 310. Therefore, since load absorption due to plastic deformation of the bending plate 310 is continuously provided from the start to the end of the collapsing motion, the collapsing motion may be stably performed.

Referring to FIG. 4, according to some embodiments, guide grooves 113a are formed in the lower tube 113 and open to two opposite sides in the axial direction to receive the stopper 220. The stopper 220 is provided on the outer circumferential surface of the upper tube 112 and is configured to move axially from the guide groove 113a of the lower tube 113 during the telescoping motion and the collapsing motion. As the stopper 220 is inserted into the guide groove 113a, when the stopper 220 is axially supported by the impact load absorber 210 and the collapsing stroke is limited, the stopper 220 is prevented from being separated from the upper tube 112, and thus the collapsing motion may be stably terminated.

Referring to FIG. 5A, according to some embodiments, a coupling part 511 to which the stopper 220 is coupled is formed in the upper tube 112. In some embodiments, the coupling part 511 is a hole penetrating the inner circumferential surface and the outer circumferential surface of the upper tube 112, and a protrusion inserted into the coupling part 511 is formed in the stopper 220. In some embodiments, the protrusion of the stopper 220 is press-fitted into the coupling part 511.

Referring to FIG. 5B, according to some embodiments, the upper tube 112 is provided with a plurality of coupling parts 511. The stopper 220 is coupled to one of the plurality of coupling parts 511, the plurality of coupling parts 511 being spaced apart from each other in the axial direction. FIG. 5B shows that three coupling parts 511 are provided in the upper tube 112 while being spaced apart from each other in the axial direction. The number of the coupling parts 511 in the embodiments is not limited to the number of coupling parts 511 shown in FIG. 5B. The position of the stopper 220 is adjustable on the outer circumferential surface of the upper tube 112. Since the distance between the stopper 220 and the impact load absorber 210 can be changed according to an assembly position of the stopper 220, the maximum collapsing stroke may be easily adjusted when the steering device is being assembled in the assembly step. Therefore, it is possible to provide various collapsing strokes according to characteristics of each vehicle type.

Referring to FIG. 1, one end of the lower tube 113 is hinged to the movable bracket 120, and the lower tube 113 is configured to be tilted with respect to the movable bracket 120 by the second driver 150. The second driver 150 is fixed to the fixed bracket 130 in the axial direction. In other words, when the steering wheel is stored and withdrawn, the second driver 150 is fixed to the fixed bracket 130 and does not move in the axial direction. When storing and withdrawing of the steering wheel is performed, the first driver 140 is moved together with the steering wheel in the axial direction, and the third driver 160 is moved together with the steering wheel in the axial direction except for the nut 161 coupled to the fixed bracket 130. However, the second driver 150 is not moved in the axial direction. Accordingly, interference between the components of the steering device and the peripheral components may be minimized in the operation of storing and withdrawing the steering wheel. The second driver 150 includes a tilt bracket 180, a nut 151, a screw 152, and a motor 153, which are described below.

The movable bracket 120 is coupled to the fixed bracket 130, and the fixed bracket 130 is fixed to the vehicle body. In other words, the steering device is coupled to the vehicle body through the fixed bracket 130. The movable bracket 120 is coupled to the fixed bracket 130 so as to be slidable in the axial direction. As the movable bracket 120 slides in the axial direction with respect to the fixed bracket 130, the entire steering device moves in the axial direction. The third driver 160 moves the movable bracket 120 with respect to the fixed bracket 130, and accordingly, the steering device is moved in the axial direction. The third driver 160 includes a nut 161, a screw 162, and a motor 163.

The operation of storing and withdrawing the steering wheel may be performed by simultaneously moving the upper tube 112 with respect to the lower tube 113 by the first driver 140 and moving the movable bracket 120 with respect to the fixed bracket 130 by the third driver 160. In other words, since the steering wheel moves according to the movement generated by the first driver 140 and the third driver 160, the storing and withdrawing operations may be quickly performed.

Referring to FIGS. 1 and 6, according to some embodiments, the fixed bracket 130 includes a receiving part 131 that is open in the axial direction and receives the movable bracket 120, and a pair of plate parts 132 supported on two opposite side surfaces of the movable bracket 120 in a width direction, the width direction being perpendicular to the axial direction. The movable bracket 120 is received in the receiving part 131, and the receiving part 131 is open to two opposite sides in the axial direction so that the movable bracket 120 may move in the axial direction. The pair of plate parts 132 is supported on two opposite side surfaces of the movable bracket 120 in the width direction. The movable bracket 120 is coupled to the pair of plate parts 132 so as to be slidable in the axial direction. Since the pair of plate parts 132 is supported on two opposite side surfaces of the movable bracket 120 in the width direction to guide the axial movement of the movable bracket 120, the operation of storing and withdrawing the steering wheel may be stably performed. Guide structures may be provided on two opposite side surfaces of the movable bracket 120 in the width direction and on the inner surface of the plate part 132 so that the movable bracket 120 may stably slide with respect to the fixed bracket 130. In some embodiments, supports 611 supported by the nut 161 are formed on the fixed bracket 130 and opposing each other in the axial direction, and the nut 161 is supported by the supports 611 and fixed to the fixed bracket 130 in the axial direction.

Referring to FIG. 7A, according to some embodiments, rail grooves 133 are formed on inner surfaces of the plate parts 132 and extend along the axial direction, and guide protrusions 121 inserted into the rail grooves 133 are formed on two opposite side surfaces of the movable bracket 120 in the width direction. Like the receiving part 131, the rail groove 133 are open in the axial direction. Each of the guide protrusions 121 is inserted into a corresponding rail groove of the rail grooves 133, and the movable bracket 120 is coupled to the fixed bracket 130.

In some embodiments, each of the rail grooves 133 extend from one end to another opposite end of the plate part 132 in the axial direction, and each of the guide protrusions 121 extends from one end to another opposite end of the movable bracket 120 in the axial direction. In other words, when the movable bracket 120 slides, compared with a case where the rail grooves do not extend from one end to another opposite end of the plate part in the axial direction and the guide protrusion do not extend from one end to another opposite end in the axial direction, the movable bracket 120 has a larger contact area with the fixed bracket 130, and thus the stability of the operation of storing and withdrawing the steering wheel is enhanced.

According to some embodiments, each of the guide protrusions 121 includes a protrusion protruding from two opposite side surfaces of the movable bracket 120 in the width direction and a bend at an end portion of the protrusion. The rail groove 133 is formed in a shape corresponding to the shapes of the protrusion and the bend. In some embodiments, the protrusion protrudes in a direction perpendicular to two widthwise opposite side surfaces of the movable bracket 120, and the bend may be bent and extended in a direction inclined upward or downward with respect to the protrusion at an end portion of the protrusion.

In some embodiments where the guide protrusion 121 includes a protrusion and a bend, the guide protrusion 121 is supported on the fixed bracket 130 in two opposite width directions while being inserted into the rail groove 133. Accordingly, the stability of the axial movement of the movable bracket 120 may be further enhanced. Further, according to some embodiments, a bushing for reducing friction is further provided between the guide protrusion 121 and the rail groove 133.

Referring to FIG. 7B, according to some embodiments, rail grooves 721 are formed in two widthwise opposite side surfaces of the movable bracket 120 and extend along the axial direction, and guide protrusions 711 inserted into the rail grooves 721 are formed on the inner side surface of the plate part 132. Like the receiving part 131, the rail groove 721 is open in the axial direction. The guide protrusion 711 is inserted into the rail groove 721, and the movable bracket 120 is coupled to the fixed bracket 130.

In some embodiments, the rail groove 721 extends from one end to another opposite end of the movable bracket 120 in the axial direction, and the guide protrusion 711 extends from one end to another opposite end of the plate part 132 in the axial direction. In other words, compared with a case where the rail groove does not extend from one end to another opposite end of the movable bracket in the axial direction and the guide protrusion does not extend from one end to another opposite end of the plate part in the axial direction, the movable bracket 120 has a larger contact area with the fixed bracket 130 when the movable bracket 120 slides with respect to the fixed bracket 130. Accordingly, the stability of the storing and withdrawing operation of the steering wheel is enhanced.

According to some embodiments, the guide protrusion 711 includes a protrusion protruding from an inner surface of the plate part 132 and a bend at an end portion of the protrusion. The rail groove 721 is formed in a shape corresponding to the shapes of the protrusion and the bend. In some embodiments, the protrusion protrudes in a direction perpendicular to the inner surface of the plate part 132, and the bend is bent and extended in a direction inclined upward or downward with respect to the protrusion at an end portion of the protrusion. In some embodiments where the guide protrusion 711 includes a protrusion and a bend, the guide protrusion 711 is supported on the movable bracket 120 in two opposite width directions while being inserted into the rail groove 721. Accordingly, the stability of the axial movement of the movable bracket 120 may be further enhanced. Further, according to some embodiments, a bushing for reducing friction is further provided between the guide protrusion 711 and the rail groove 721.

A steering device 100 of a vehicle according to some embodiments includes an upper tube 112 receiving a steering shaft 111, a lower tube 113 receiving the upper tube 112, a movable bracket 120 to which one end of the lower tube 113 is hinged, a fixed bracket 130 fixed to a vehicle body and to which the movable bracket 120 is slidably coupled in an axial direction, a first driver 140 for sliding the upper tube 112 with respect to the lower tube 113, a second driver 150 for tilting the lower tube 113 with respect to the movable bracket 120, a coupling bracket 170 coupling the second driver 150 to the fixed bracket 130, and a third driver 160 for sliding the movable bracket 120 with respect to the fixed bracket 130. The same features as those of the above-described embodiments will be briefly described, and the description focuses primarily on differences.

Referring to FIGS. 1, 2, and 8, the upper tube 112 is slidable in the axial direction with respect to the lower tube 113 and is configured to be slid by the first driver 140. One end of the lower tube 113 is hinged to the movable bracket 120, and is configured to be tilted by the second driver 150. The movable bracket 120 is coupled to the fixed bracket 130 fixed to the vehicle body to be slidable in the axial direction, and is slid by the third driver 160. The steering wheel may be stored and withdrawn by the movement generated by the first driver 140 and the third driver 160.

The coupling bracket 170 couples the second driver 150 to the fixed bracket 130. The second driver 150 is fixed to the fixed bracket 130 in the axial direction by the coupling bracket 170. Accordingly, when the steering wheel is stored and withdrawn, the second driver 150 is fixed to the fixed bracket 130 and does not move in the axial direction, and thus interference between the components of the steering device and the peripheral components is minimized.

Referring to FIGS. 8 to 10, according to some embodiments, the coupling bracket 170 includes a first coupling part 171 coupled to the fixed bracket 130 and a second coupling part 172 coupled to the second driver 150. In some embodiments, the first coupling part 171 is coupled to the fixed bracket 130 by bolting. In some embodiments, the second coupling part 172 is hinged to the second driver 150. In some embodiments, the second coupling part 172 has a yoke shape and is hinged to the second driver 150 by a pin. As the second coupling part 172 is hinged to the second driver 150, a driving range in the rotation direction is provided to the second driver 150, and the tilting motion of the steering device may be smoothly performed.

According to some embodiments, the second driver 150 includes a tilt bracket 180, a nut 151 hinged to the tilt bracket 180, a screw 152 engaged with the nut 151, and a motor 153 for rotating the screw 152. The tilt bracket 180 includes a third coupling part 181 hinged to the fixed bracket 130 and a fourth coupling part 182 rotatably and slidably coupled to the lower tube 113. In some embodiments, the second driver 150 further includes a reducer connecting the screw 152 and the motor 153, and a housing receiving the reducer is coupled to the second coupling part 172 of the coupling bracket 170. In some embodiments, the reducer of the second driver 150 is, but not limited to, e.g., a reducer including a worm shaft-worm wheel.

In some embodiments, an auxiliary bracket 1001 (FIG. 10) coupled to the fixed bracket 130 and the movable bracket 120 is further provided so that the tilting motion of the steering device may be stably performed. In some embodiments, the auxiliary bracket 1001 is coupled to the fixed bracket 130 to be rotatable but fixed in the axial direction, and is coupled to the movable bracket 120 to be rotatable and slidable. The auxiliary bracket 1001 is provided on the opposite side of the tilt bracket 180 to enhance stability of the tilting motion by the second driver 150.

In some embodiments, the tilt bracket 180 is rotatable about a portion of the third coupling part 181 coupled to the fixed bracket 130, but is fixed in the axial direction. The tilt bracket 180 is rotated about a portion of the third coupling part 181 coupled to the fixed bracket 130 by the second driver 150. According to some embodiments, for example in FIG. 10, the third coupling part 181 is coupled to the fixed bracket 130 by a first coupling member 811 that passes through the third coupling part 181 and has an end portion rotatably coupled to the fixed bracket 130. In other words, the tilt bracket 180 is rotatable by the second driver 150 about an axis of the first coupling member 811.

Referring to FIG. 11, according to some embodiments, a guide bushing 1101 is coupled to an end portion of the first coupling member 811. The guide bushing 1101 is interposed between the first coupling member 811 and the fixed bracket 130 and between the third coupling part 181 and the fixed bracket 130, thereby reducing friction during a tilting motion of the steering column.

Referring back to FIGS. 8 to 10, as the tilt bracket 180 is rotated about the axis of the first coupling member 811 by the second driving part 150, the lower tube 113 coupled to the fourth coupling part 182 is tilted with respect to the movable bracket 120. The fourth coupling part 182 is rotatably and slidably coupled to the lower tube 113. As the fourth coupling part 182 is rotatably and slidably coupled to the lower tube 113, the lower tube 113 is movable in the axial direction with respect to the movable bracket 120.

According to some embodiments, the fourth coupling part 182 is coupled to the lower tube 113 by a second coupling member 812 passing through the fourth coupling part 182 and having an end portion rotatably coupled to the lower tube 113, and the lower tube 113 is provided with an axial guide slit 114 where an end portion of the second coupling member 812 is seated. As the second coupling member 812 is inserted into the guide slit 114 in the axial direction, relative movement between the movable bracket 120 and the tilt bracket 180 occurs in response to moving the movable bracket 120 with respect to the fixed bracket 130 by the third driver 160. Further, in response to the tilt bracket 180 being rotated by the second driver 150, torque is transferred to the movable bracket 120 through the second coupling member 812, and a tilting motion of the steering device is performed. In some embodiments, the guide slits 114 are provided on two opposite side surfaces of the lower tube 113 in the width direction, and the tilt bracket 180 and the auxiliary bracket 1001 are coupled by a coupling member (see FIGS. 4 and 10).

Referring to FIG. 12, according to some embodiments, a guide bushing 1201 is coupled to an end portion of the second coupling member 812. The guide bushing 1201 is interposed between the second coupling member 812 and the lower tube 113 and between the fourth coupling part 182 and the lower tube 113 to reduce friction during the tilting motion and the storing and withdrawing operation of the steering wheel.

By the so-shaped vehicle steering column, it is possible to quickly and stably perform an operation of storing and withdrawing the steering wheel for securing a space in a driver's seat, and enhance operation stability by minimizing interference with peripheral components during the operation of storing and withdrawing the steering wheel.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering device of a vehicle, the steering device comprising:
   an upper tube receiving a steering shaft;
   a lower tube receiving the upper tube;
   a movable bracket to which one end of the lower tube is hinged;
   a fixed bracket configured to be fixed to a vehicle body, wherein the movable bracket is slidably coupled to the fixed bracket in an axial direction of the steering device;
   a first driver for sliding the upper tube relative to the lower tube;
   a second driver axially fixed to the fixed bracket to tilt the lower tube with respect to the movable bracket; and
   a third driver for sliding the movable bracket with respect to the fixed bracket,
   wherein
   the first driver includes a nut coupled to the upper tube, a screw engaged with the nut, and a motor coupled to the lower tube to rotate the screw,
   the nut is coupled to the upper tube through an impact load absorber including a bending plate,
   a stopper axially overlapping the impact load absorber is provided on an outer circumferential surface of the upper tube, and
   the lower tube has a guide groove open to two axially opposite sides to receive the stopper.

2. The steering device of claim 1, wherein the first driver further includes a reducer connecting the screw and the motor.

3. The steering device of claim 1, wherein
   the upper tube includes a plurality of coupling parts axially spaced apart from each other, and
   the stopper is coupled one of the plurality of coupling parts.

4. The steering device of claim 1, wherein the third driver includes a nut coupled to the fixed bracket, a screw engaged with the nut, and a motor coupled to the movable bracket to rotate the screw.

5. The steering device of claim 1, wherein the fixed bracket includes
   a receiving part open in the axial direction to receive the movable bracket; and
   a pair of plate parts supported on two opposite side surfaces of the movable bracket in a width direction perpendicular to the axial direction.

6. The steering device of claim 5, wherein
   a rail groove is formed on an inner surface of the plate part along the axial direction, and
   a guide protrusion inserted into the rail groove is formed on the two widthwise opposite side surfaces of the movable bracket.

7. The steering device of claim 5, wherein
   a pair of rail grooves is formed on the two widthwise opposite side surfaces and extends along the axial direction, and
   a pair of guide protrusions inserted into the pair of rail grooves is formed on inner surfaces of the pair of plate parts, respectively.

8. A steering device of a vehicle, the steering device comprising:
   an upper tube receiving a steering shaft;
   a lower tube receiving the upper tube;
   a movable bracket to which one end of the lower tube is hinged;
   a fixed bracket configured to be fixed to a vehicle body, wherein the movable bracket is slidably coupled to the fixed bracket in an axial direction of the steering device;
   a first driver for sliding the upper tube relative to the lower tube;
   a second driver for tilting the lower tube with respect to the movable bracket;
   a coupling bracket coupling the second driver to the fixed bracket; and
   a third driver for sliding the movable bracket with respect to the fixed bracket,
   wherein the coupling bracket includes a first coupling part fixed to and immovable with respect to the fixed bracket.

9. The steering device of claim 8, wherein the coupling bracket further includes
   a second coupling part coupled to the second driver.

10. The steering device of claim 9, wherein the first coupling part is fixed to the fixed bracket by bolting.

11. The steering device of claim 9, wherein the second coupling part is hinged to the second driver.

12. The steering device of claim 8, wherein the second driver includes a tilt bracket, a nut hinged to the tilt bracket, a screw engaged with the nut, and a motor for rotating the screw, and
   wherein the tilt bracket includes a third coupling part hinged to the fixed bracket and a fourth coupling part rotatably and slidably coupled to the lower tube.

13. The steering device of claim 12, wherein the third coupling part is coupled to the fixed bracket by a first coupling member passing through the third coupling part and having an end portion rotatably coupled to the fixed bracket.

14. The steering device of claim 13, wherein a guide bushing is coupled to the end portion of the first coupling member.

15. The steering device of claim 12, wherein the fourth coupling part is coupled to the lower tube by a second coupling member passing through the fourth coupling part and having an end portion rotatably coupled to the lower tube, and
   wherein the lower tube is provided with an axial guide slit where the end portion of the second coupling member is seated.

16. The steering device of claim 15, wherein a guide bushing is coupled to the end portion of the second coupling member.

17. A steering device of a vehicle, the steering device comprising:
   an upper tube receiving a steering shaft;
   a lower tube receiving the upper tube;
   a movable bracket to which one end of the lower tube is hinged;
   a fixed bracket configured to be fixed to a vehicle body, wherein the movable bracket is slidably coupled to the fixed bracket in an axial direction of the steering device;
   a first driver for sliding the upper tube relative to the lower tube;
   a second driver for tilting the lower tube with respect to the movable bracket;
   a coupling bracket coupling the second driver to the fixed bracket; and
   a third driver for sliding the movable bracket with respect to the fixed bracket, wherein the second driver includes a tilt bracket, a nut hinged to the tilt bracket, a screw engaged with the nut, and a motor for rotating the screw, wherein the tilt bracket includes a third coupling part hinged to the fixed bracket and a fourth coupling part rotatably and slidably coupled to the lower tube, and wherein the third coupling part is coupled to the fixed bracket by a first coupling member passing through the third coupling part and having an end portion rotatably coupled to the fixed bracket, and a guide bushing is coupled to the end portion of the first coupling member, or wherein the fourth coupling part is coupled to the lower tube by a second coupling member passing through the fourth coupling part and having an end portion rotatably coupled to the lower tube, and the lower tube is provided with an axial guide slit where the end portion of the second coupling member is seated.

\* \* \* \* \*